United States Patent
Hostyn et al.

(10) Patent No.: US 6,745,389 B1
(45) Date of Patent: Jun. 1, 2004

(54) SYSTEM OF OBJECTS AND PROGRAM COMPONENTS

(75) Inventors: Tom Frans Maurits Hostyn, Halle (BE); Michel Feret, Brussels (BE); Magdalena Anna Wasowska, Kessel-Lo (BE)

(73) Assignee: Sony Service Center (Europe) N.V., Londerzeel (BE)

(*) Notice: Subject to any disclaimer, the term of this patent is extended or adjusted under 35 U.S.C. 154(b) by 0 days.

(21) Appl. No.: 09/538,253

(22) Filed: Mar. 30, 2000

(30) Foreign Application Priority Data

Mar. 31, 1999 (EP) .............................. 99200981

(51) Int. Cl.⁷ ................................. G06F 9/44
(52) U.S. Cl. ..................... 719/315; 719/316; 719/331; 719/332
(58) Field of Search .................. 709/312–318, 709/331–332; 719/315, 316, 331, 332

(56) References Cited

U.S. PATENT DOCUMENTS

| | | | |
|---|---|---|---|
| 5,280,610 A | * 1/1994 | Travis et al. ............ 707/103 R |
| 5,396,630 A | * 3/1995 | Banda et al. ............... 709/316 |
| 5,659,751 A | 8/1997 | Heninger |
| 5,748,963 A | 5/1998 | Orr |
| 5,797,015 A | * 8/1998 | Daniels et al. ............. 717/163 |
| 5,951,649 A | * 9/1999 | Dobbins et al. ........... 709/238 |
| 6,138,168 A | * 10/2000 | Kelly et al. ................. 709/310 |

FOREIGN PATENT DOCUMENTS

EP 0 546 684 6/1993

EP 0 871 119 A1 10/1998 ............. G06F/9/46

OTHER PUBLICATIONS

The Open Group, Management: Event Management Service, The Open Group, Feb. 1997.*
Munro, Writing DLLs for Windows using Visual Basic, part 1, PC Magazine, v. 11, n 11, pp. 379(6).*
Krishna, Expliitly Linking to Classes in DLL's.*
Mancini L V: "A Technique for Subclassing and its Implementation Exploiting Polymorphic Procedures" Software–Practice and Experience, Apr. 1988, UK, vol. 18, No. 4, pp. 287–300, XP–002114375.

* cited by examiner

Primary Examiner—Meng-Al T. An
Assistant Examiner—Diem Cao
(74) Attorney, Agent, or Firm—Frommer Lawrence & Haug LLP; William S. Frommer; Hans R. Mahr

(57) ABSTRACT

The present invention provides a system of objects and program components wherein an object accesses different associated program components for different implementations of a corresponding function of the object.

The system comprises:
  a first object having one or more functions;
  a first program component having one or more functions, the first program component being dynamically linked to the first object at a run-time of the first object; and wherein the first object access the first program component using a function call which may result in the access to a second program component having one or more functions.

2 Claims, 4 Drawing Sheets

SYSTEM OF OBJECTS AND PROGRAM COMPONENTS

The present invention provides a system of objects and program components wherein an object accesses different associated program components for different implementations of a corresponding function of the object.

In object-oriented software the software program is organized as a set of discrete modules or objects, which comprise both a data structure and behavior. An object is a run-time entity with its own thread or threads of execution with its own system resources. Objects with the same data structure and behavior (operations) are grouped into a class. Each object is an instance of a certain class. The operations determine the message to which the object can respond, while the state is hidden from the outside like for example other objects. The operations on the objects are called methods.

Each object has an execution environment which describes the properties of the object e.g. which memory areas the object can access, which threads the object code execute and which is the run-time environment of the object. Communication between objects occurs by message passing. In EP 0 871 119 A1 a form of message passing is described. To execute message passing each object has an external interface, also called send interface, which arranges the receiving of the message and with which the different methods of the corresponding object are operable.

Known object-oriented software programs implement the concept of polymorphism. Polymorphism is often considered the most powerful facility of an object-oriented language. Polymorphism means the ability to take several forms. In the context of object-oriented software, this means that for the same entity to refer at run-time to instances of various classes. A restricted view of this is that the same operation may behave differently on different classes. However in the known object-oriented software programs the concept of polymorphism is implemented only at objects level.

Therefore, it is the object underlying the present invention to provide polymorphism at a much smaller level, i.e. at a level of program components, each of which is an element of an object that implements one responsibility of that object. Contrary to known systems of software the present invention provides a system wherein the same function of an object can hide a call to different program components, i.e. different pieces of program code, wherein different implementations of a function are given, without changing or altering the object itself. More specifically, a function call from an object can contain different parameters, whereas the same function call may result in the invocation of different program components with different implementations of the function of the object, depending on these parameters. An object can therefore use different program components with an identical internal interface simultaneously by loading the program components explicitly into memory and calling them.

The system according to the present invention therefore comprises:
  a first object having one or more functions;
  a first program component having one or more functions, the first program component being dynamically linked to the first object at a run-time of the first object; and wherein the first object access the first program component using a function call which may result in the access to a second program component having one or more functions.

The first program component resides in a first execution environment of the first object. The second program component provides the same interface as the first program component provides to the first object, wherein the first and the second program component have no own thread and resources.

The present invention will now be described by way of a preferred embodiment with reference to the accompanying drawings, throughout which like parts are referred to by like references, and in which.

Figure 1:
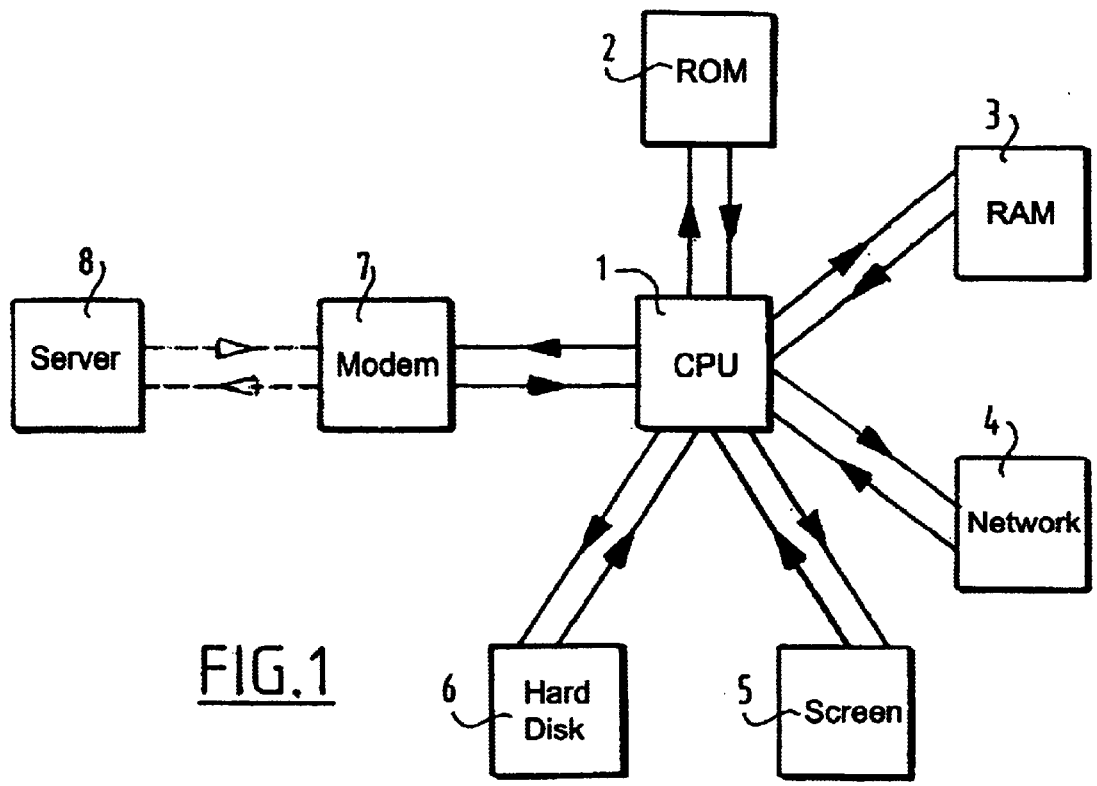
FIG. 1 is a block diagram showing a preferred embodiment of a device in which the system of the present invention is implemented.

In FIG. 1 is schematically shown a PC or workstation with a central processing unit 1 which is connected to a read only memory (ROM) 2, a random access memory (RAM) 3, a network 4, a screen 5, a hard disk 6, and a modem 7. The central processing unit 1 processes data from the hard disk 6, the network 4 or the modem 7 with the aid of the ROM 2 and the RAM 3. With the modem 7 a connection can be made with external sources for example an internet server 8. Software programs reside in RAM 3 and/or ROM 2 are executed by the central processing unit 1.

In the present invention, an object is decomposed into smaller, dynamically linkable pieces of software, i.e., program components. A program component allows an object to change, increase and adopt functionality dynamically. A program component has no own thread and resources. Therefore it can not run by itself, but can be linked dynamically, at run time, to multiple objects in the system. More precisely, a program component is a constituent of an object that implements one responsibility of that object. It can be said that a program component is loaded in an object if the program component resides in the execution environment of that object. Any number of the program components can be loaded in the object. When used, the program components will physically reside in the RAM 3 shown in FIG. 1. However they can be stored on secondary data storage devices for example the hard disk 6 or be fetched from a computer-network for example the network 4 prior to being used.

A program component may provide an internal interface. This interface is an ordered list of functions that are implemented by the program component and that can be called by any code in the same execution environment. This interface only exports functions, not data. Both the object's statically linked code and other program component's code can invoke program components.

Figure 2:
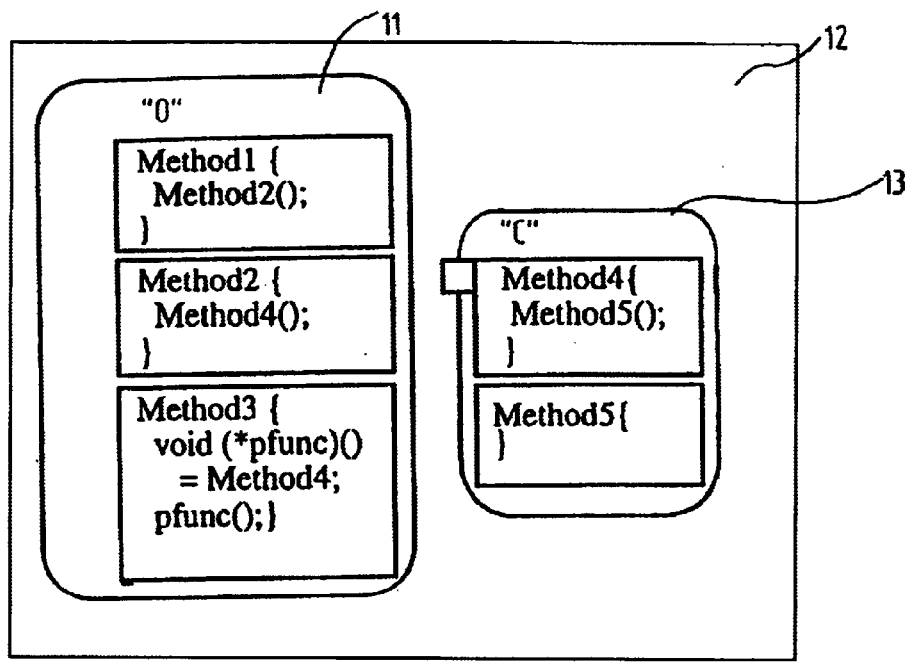
FIG. 2 is a schematic representation showing communication between an object and a program component inside an execution environment.

In FIG. 2 an object 11, an execution environment 12 of the object 11 and a program component 13 residing in the execution environment 12 are shown. In FIG. 2 a function is represented by a rectangle in the object 11 or the program component 13. The object 11 comprises three functions Method1, Method2 and Method3. The program component 13 comprises two functions Method4 and Method5. If a method of the program component 13 is in the internal interface of the program component 13, a small rectangle on the boundaries of the program component 13 connected to the box of the method is drawn in FIG. 2. For example, Method4 of the program component 13 is in the internal interface of the program component 13. It is therefore accessible by the object 11. The Method5 is not in the internal interface and can only be invoked from within the program component 13. The internal interface is the only supported way of communication with the program component, using function calls. Since the object's code does not have an internal interface, it can not be invoked by the program component 13. For example, Method4 of the program component 13 can not invoke Method1 or Method2 of the object 11.

Communication within an object occurs by function call. This can take the following three forms:
1. Internal call to the object. The caller calls a function which is part of the object's code. This code is statically linked and is an intrinsic part of the object. It is guaranteed to be present. This is a traditional function call. In FIG. 2, the functions Method1, Method2 and Method3 are statically linked to the object 11. Method1 can call Method2.
2. Implicit dynamic linking. The caller refers to a program component in its source code, using direct function calls. Dynamic linking techniques are then used to guarantee that the unresolved entries in the caller are resolved to the program component. This means that the dynamic linker will fetch the code of the program component and install it in the execution environment before running it. In FIG. 2, Method2 of the object 11 calls Method4 of the program component 13. Before Method4 is invoked, the program component 13 is loaded in the execution environment 12 of the object 11 and is dynamically linked to the object 11.
3. Explicit dynamic linking. The caller does not refer to the program component directly, but the dynamic linker provides mechanisms to load the necessary program component. The caller can consult interface descriptions and use for example function pointer called pfunc. A function pointer is a variable, and the address of any method is assigned to this variable. Later the assigned method is invoked using the variable. In FIG. 2 Method4 of the program component 13 can be assigned to pfunc and invoked from Method3 of the object 11 using the function pointer.

Figure 3:
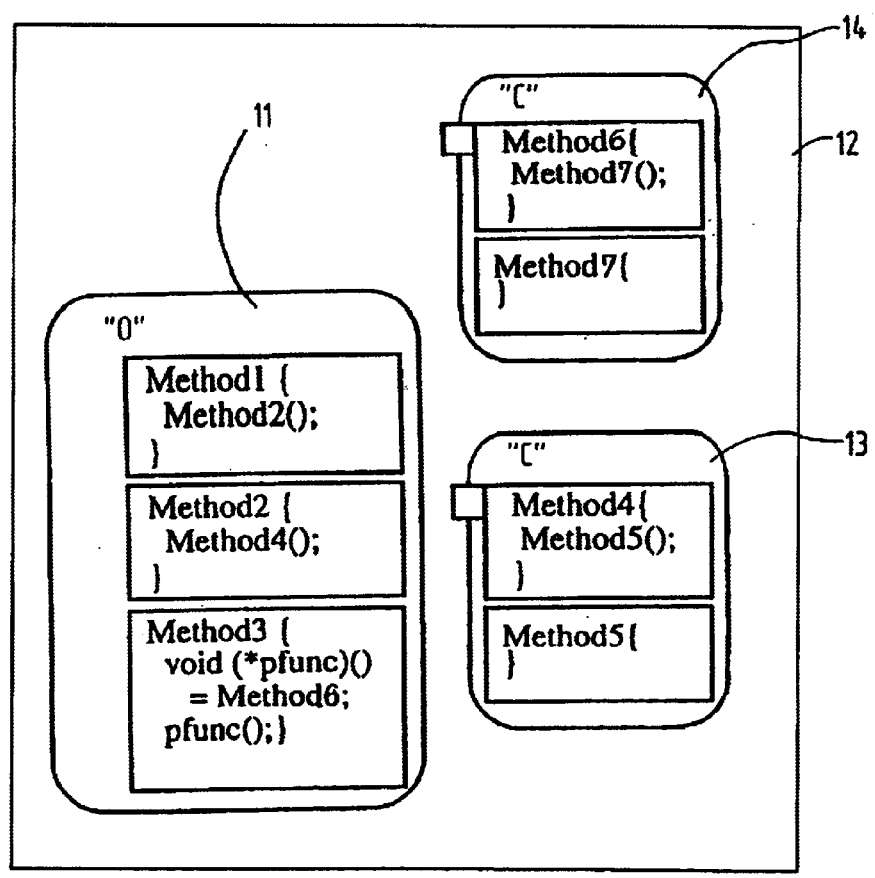
FIG. 3 is a schematic representation showing communication between an object and two program components inside an execution environment.

In FIG. 3, a program component 14 is shown in addition to the program component 13. The program component 14 resides in the execution environment 12 of the object 11. In this case, in stead of Method4 of the program component 11, Method6 of the program component 14 is assigned to pfunc and invoked by the Method3 of the object 11, using the function pointer.

Consequently the program component 13 and the program component 14 can implement variations of the same functionality with in the same object 11.

Method3 of the object 11 in FIG. 2 can for example have the function of rotating a rectangular window on the screen 5 of the earlier mentioned device. The actual implementation of the rotation is achieved by Method4 of program component 13.

If for example the need arises to rotate not only rectangular windows but also triangular windows, in known programming techniques the object 11 have to be replaced by an adapted version thereof to implement the functionality of rotating also a triangle. In this system according to the present invention this is however not necessary. If Method3 wishes to rotate a triangular instead of a rectangular window the program component 14 is loaded in the execution environment 12 as shown in FIG. 3. In this case, Method6 implements the rotation of triangular.

As described above, according to the present invention, an object can refer to different program components at run time. More specifically, an object can use different program components that implement the same internal interface in different ways, by loading the program components explicitly and calling them using function pointers. In this way the dynamic linking mechanisms of this preferred embodiment allow for run-time polymorphism at program component level.

In the following description another example of the preferred embodiment according to the present invention will be explained.

Message passing services offered to an object of its execution environment is realized by an object called a mailer. Each execution environment has one mailer. It can be shared among multiple execution environments. A mailer handles both intra- and inter-execution environment messaging. Each mailer handles the message queues for the objects residing in the execution environments it supports. A message queue is created when a newly object is registered to the mailer. Such a registered object can be interested in inter-execution environment communication or not. Depending on this information, the object itself is registered to a system mailer. The system mailer is the mailer responsible for managing queues for all mailers in the system. The responsibilities of the system mailer are exactly the same as those of the mailers, but its "objects" are mailers. Moreover, the system mailer stores the mapping between all mailers and their objects that were registered for inter-execution environment communication. When an object exits one of its methods and its queue not empty, the mailers select the next message from the objects queue according to its policy and stores a pointer to it in the context of the object. The deletion of messages that are already processed depends on the policy of the mailer. In case of sending a message to an object residing in another execution environment, the only responsibility of the sending mailer is to queue the message into the queue of the receiver's mailer using the system mailer.

In the case of message passing between two execution environments with different semantics (inter-execution environment message passing), different interfaces can be offered to objects, different message box formats of implementation can be used.

Figure 4:
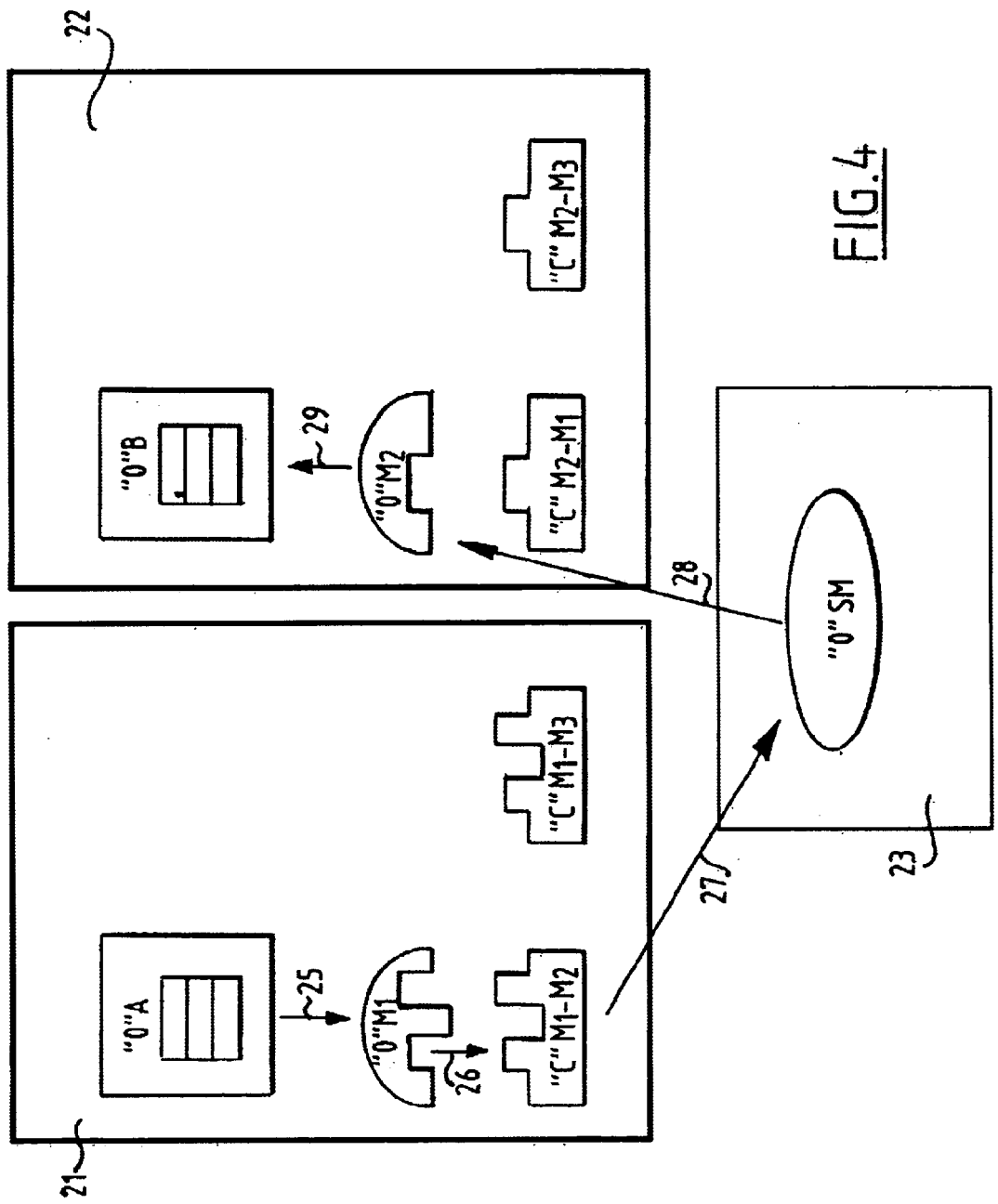
FIG. 4 is a schematic representation describing two mailers implementing a message passing of two different execution environments.

FIG. 4 describes two mailers M1 and M2 implementing the message passing of two different execution environments 21, 22. The implementation of a mailer is realized by the program components.

In FIG. 4, a mailer M1 includes a program component (not shown) that realizes the interfaces of the mailer M1. Objects running in the execution environment 21 will use these interfaces to send messages to each other or to objects running in execution environments with the same mailer M1. For example "( )", "Send ( )", Delete ( )" and "Kick ( )" interfaces are offered to the object A. Also a mailer M2 includes a program component that offers "Send ( )" and "Reply ( )" interfaces to the object B.

Besides the component that offers interfaces to an object of its execution environment, the mailer is also provided extra program components for messaging with other existing execution environments. For example, if the object A in the execution environment 21 is expected to be able to communicate with the object B in the execution environment 22, the program components M1–M2 for sending messages from mailer M1 to mailer M2 are dynamically linked to the mailer M1. Usually communication is bi-directional, so the program components M2-M1 for sending (reply) messages form the mailer M2 to the mailer M1 are also dynamically linked to the mailer M2.

The interface of the program components M1–M2 matches mailer M1's interface. Therefore, the program components M1–M2 provide a new implementation for the mailer M1. This implementation is specific to the mailer M2 and is used to send messages from the mailer M1 to the mailer M2. Similarly the interface of the program components M2-M1 matches mailer M2's interface. Therefore, the program components M2-M1 provide a new implementation for the mailer M2.

When a mailer M1 receives a message (25) from the object A of the execution environment 21, it first checks whether the destination object, in this case object B, resides in the execution environment 21. If it does not, then the mailer M1 has to use the system mailer SM in system environment 23 to forward the message to the mailer M2 of the destination object B. Mailer M1 calls (26) the appropriate method of program components M1–M2 through the internal interface thereof. The program components M1–M2 then provide the method to create a message that matches the message format of Mailer M2 of the receiving execution environment 22. Then this message is sent (27) to the corresponding queue of the system mailer SM (which has a queue for every mailer in the system). Then the system mailer SM delivers (28) this message to the mailer M2, which in turn delivers (29) the message to the object B.

Figure 5:
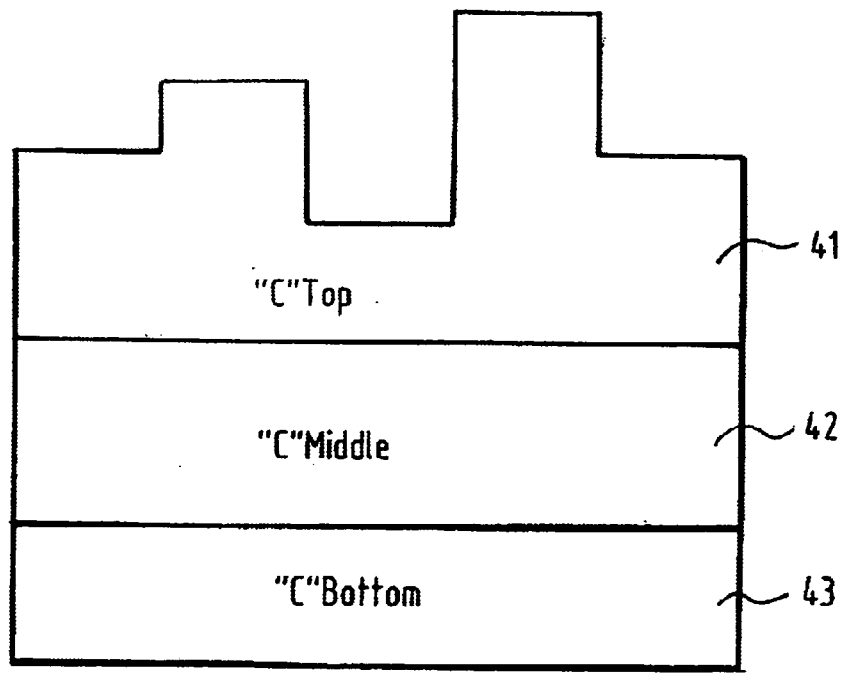
FIG. 5 is a schematic representation showing decomposition of program components of a mailer.

If a mailer for example mailer M1 is expected to realize inter-execution environment communication, the program components M1–M2 may be decomposed into three distinctive parts, as shown in FIG. 5. These parts can be implemented as separate program components.

The top part 41 is the interface which is determined by the sending mailer.

The bottom part 43 is the code which marshals the sent message to fit the receiving mailer interface description. This bottom part is optional. It can be used to marshal the message into a representation of message common to all mailers in the system.

The middle part 42 is hand crafted by the programmer of the receiving mailer to map the interface of the sending mailer and its semantics to its own interface and message semantics.

A given mailer may have to communicate with many other mailers. In the approach described here, it is possible to make each mailer use different middle and bottom program component for each destination mailer. The distinction is made in a pure object-oriented way, through a simple method call which hides the choice of the program components.

Figure 6:
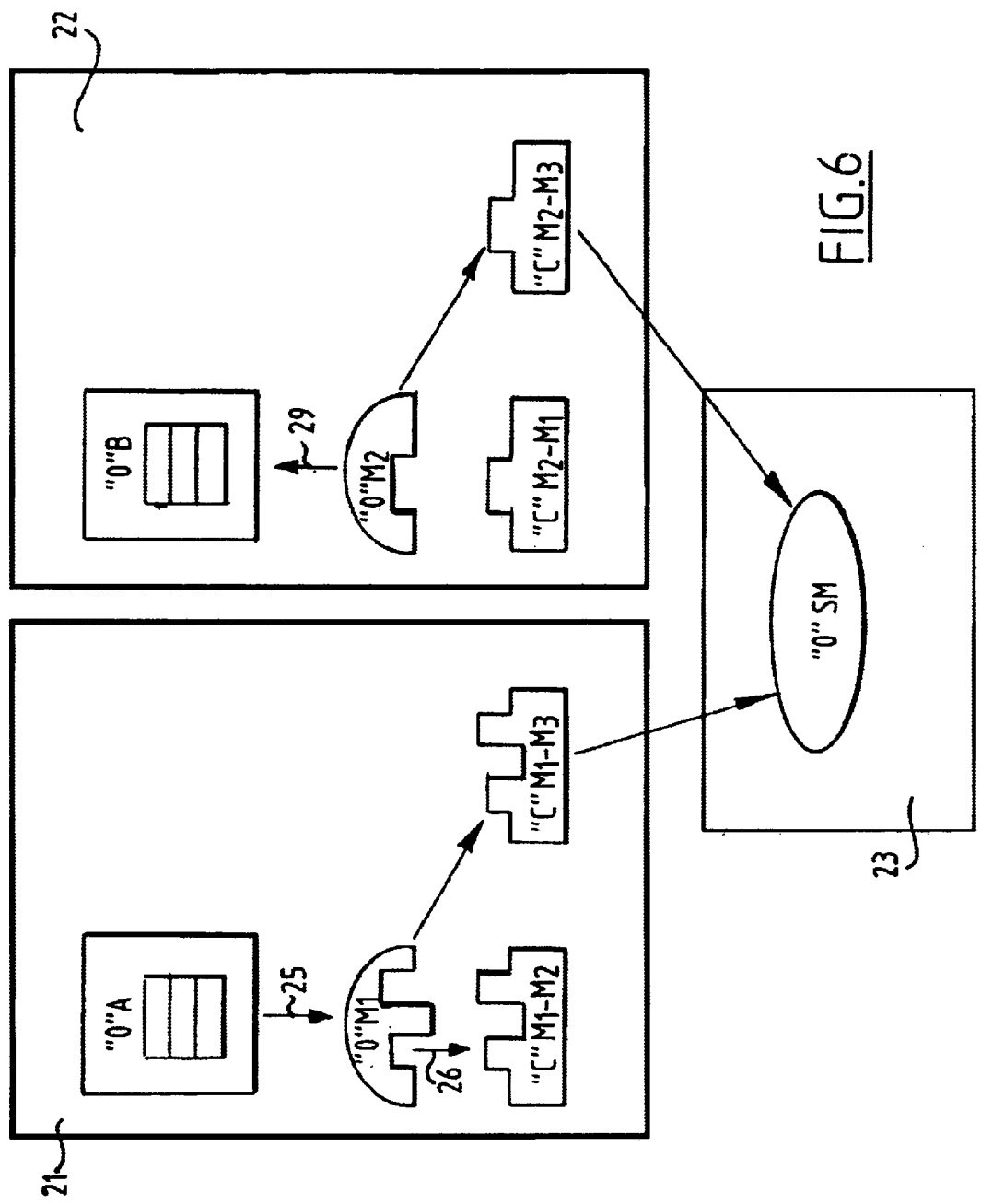
FIG. 6 is a schematic representation describing two mailers implementing a message passing of three different execution environments.

As shown in FIG. 6, if the object A in the execution environment 21 requires to communicate an object in the execution environment having a mailer M3 (not shown), the program components M1–M3 for sending messages from mailer M1 to mailer M3 are dynamically linked to the mailer M1. The program components M1–M3 have middle and bottom parts specific to the mailer M3, which are different from the program components M1–M2. The functions of the program components M1–M3 can be invoked from the mailer M1 through the same internal interface that the mailer M1 use for the invocation of functions of the program components M1–M2. Similarly, if the object B in the execution environment 22 requires to communicate an object in the execution environment having the mailer M3, the program components M2–M3 having middle and bottom parts which are different from the program components M2-M1 are dynamically linked to the mailer M2.

Consequently the program components M1–M2 and the program components M1–M3 can implement variations of the same functionality with in the same mailer M1. Also the program components M2-M1 and the program components M2–M3 can implement variations of the same functionality with in the same mailer M2.

What is claimed is:

1. System for accessing program components comprising:

a first object having one or more functions;

a first program component having one or more functions; and a second program component having one or more functions;

wherein the first program component and the second program component are both constituents of the first object, wherein the first object uses a function call to access one of the first program component or the second program component according to one or more parameters provided in the function call, wherein the first program component is dynamically linked to the first object at a run-time of the first object if the one or more parameters in the function call indicate the first program component is to be accessed, wherein the second program component is dynamically linked to the first object at a run-time of the first object if the one or more parameters in the function call indicate the second program component is to be accessed, wherein the first program component resides in a first execution environment of the first object, and wherein the first object is a first mailer object for offering message passing services to an object in the first execution environment and the first program component implements a message passing to a second mailer object in a second execution environment and the second program component implements a message passing to a third mailer object in a third execution environment.

2. System according to claim 1 wherein the first program component comprises at least a part mapping an interface and semantics of the first mailer object to an interface and semantics of the second mailer object and the second program component comprises at least a part mapping an interface and semantics of the fist mailed object to an interface and semantics of the third mailer object.

* * * * *